United States Patent [19]

Muhlecker et al.

[11] Patent Number: 4,969,372

[45] Date of Patent: Nov. 13, 1990

[54] ARRANGEMENT FOR THE ADJUSTMENT OF BOWDEN PULL WIRES

[75] Inventors: Gernot Muhlecker, Zell/Ziller; Bernhard Brugger, Mayrhofen, both of Austria

[73] Assignee: Al-Ko Kober AG, Kotz, Fed. Rep. of Germany

[21] Appl. No.: 338,721

[22] Filed: Apr. 14, 1989

[30] Foreign Application Priority Data

Apr. 20, 1988 [DE] Fed. Rep. of Germany ....... 3813267

[51] Int. Cl.$^5$ .............................................. F16C 1/10
[52] U.S. Cl. .................................. 74/501.5 R; 74/502
[58] Field of Search ........................... 74/500.5–502.6; 192/111 A, 70.25, 30 W; 188/196 R, 196 M, 196 P, 2 D

[56] References Cited

U.S. PATENT DOCUMENTS

| 4,185,516 | 1/1980 | Betlinski | 74/501.5 R |
| 4,344,518 | 8/1982 | Gilmore | 74/501.5 R |
| 4,658,668 | 4/1987 | Stocker | 74/501.5 R |
| 4,854,185 | 8/1989 | Lichtenberg et al. | 74/502 X |
| 4,854,186 | 8/1989 | Jakob et al. | 74/502.4 X |

FOREIGN PATENT DOCUMENTS 3101498 9/1982 Fed. Rep. of Germany ..74/501.5 R

Primary Examiner—Vinh T. Luong
Attorney, Agent, or Firm—McGlew and Tuttle

[57] ABSTRACT

An adjustment construction for adjusting the active sheath length on a Bowden pull wire for mounting in an opening of a support wall. The arrangement includes a Bowden wire moveable in the sheath and a sheath end piece having an end into which the sheath is engageable, the sheath end piece having a surface defining a plurality of stops. The stops are positioned to provide gaps between adjacent stops and the sheath end piece is provided with a toothed rack-like displacement ribs on the outer surface of the plurality of stops. The periphery of the sheath end piece defines a longitudinal groove extending through the stops and interrupting the stops. A socket is provided for support of the Bowden wire. The socket is mounted in the wall opening and has a passage before the sheath end piece and the wire and includes an end engaged over the sheath end piece with a frictionally engageable end face. A support sleeve is provided having an interior bore engageable around the sheath end piece. The support sleeve includes a feather key elements which interconnects the support sleeve with the sheath end piece and limits relative rotation between the support sleeve and the sheath end piece but permits relative axial movement. A locking sleeve is positioned on the sheath end piece between the support sleeve and the socket. The locking sleeve includes a catch element for allowing axial movement of the locking sleeve along the groove and for being positioned between adjacent stops for preventing axial movement of the locking sleeve. A torsion spring element is provided connected to the support sleeve and connected to the locking sleeve biasing against rotational movement between the support sleeve and the locking sleeve.

7 Claims, 2 Drawing Sheets

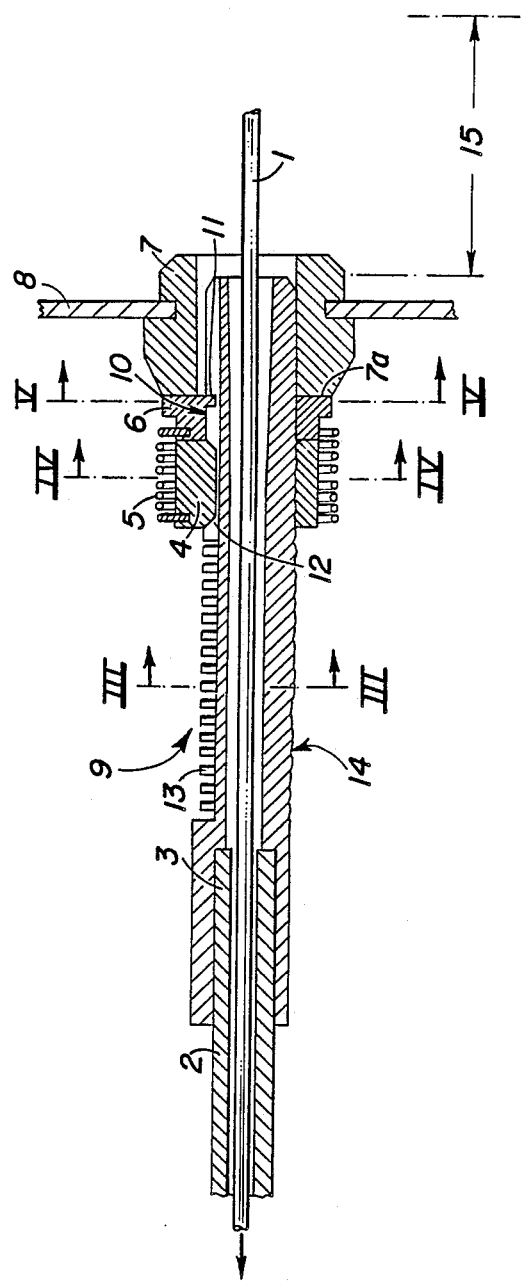
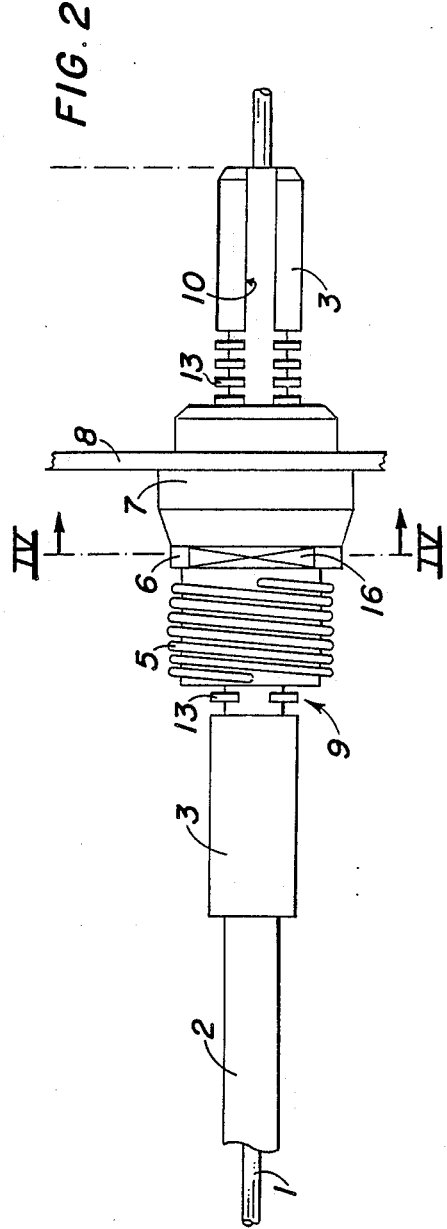

ARRANGEMENT FOR THE ADJUSTMENT OF BOWDEN PULL WIRES

BACKGROUND OF THE INVENTION

1. Field of the Invention

The invention relates in general to wire anchors and in particular to an arrangement for the adjustment of the active length of the Bowden wire sheath, wherein a support sleeve adjustable along a wire sheath end piece and propped against a fixedly mounted support can be fixed in the desired position with regard to the sheath end piece.

In bowden pull wires, the core comprising a wire, cord, rope or the like is connected to an actuation element at one end and to the element to be actuated at the other end. A sheath surrounding this core is propped against fixedly mounted supports at both ends, forming a bow. The curve of this bow determines the distance of the ends of the core from one another. Therefore, in order to install a bowden pull wire into the arrangement, e.g. into a motor vehicle, the active length of the sheath between the fixedly mounted supports has to be adjusted exactly in order to adjust the distance of the ends of the bowden wire core to the distance of the elements with regard to one another which is determined by the respective arrangement. Furthermore, it is necessary to readjust the bowden when e.g. the core has been stretched or when the position of the elements to be actuated has changed.

2. Description of the Prior Art

According to the prior art there are various options for the execution of this adjustment or readjustment. According to one principle the sheath is split and the ends of the sheath are connected to complicated sheath end pieces in the split section, they are guided into one another and are adjustable relative to one another in the lengthwise direction. In most cases this longitudinal adjustment is effected by means of engaging threadings (German Patent No. DE-PS 33 17 382). Another option is to fixedly connect one of its ends with a sheath end piece and to provide a support sleeve, or the like, whose position relative to the sheath end piece is longitudinally adjustable. By means of this support sleeve, the sheath is propped against the support. Herein, again, threading arrangements are used which present the problem of preventing some of the elements from rotating once the desired setting is achieved. For this purpose the *known* arrangements have interengaging locking elements (German Patent DE-OS 26 38 212).

If bowden pull wires are installed in arrangements in which the ends of the core are on different sides of a separation wall, such as is the case with motor vehicles, two people are required for any adjustment or readjustment of the Bowden pull wires. One person has to actuate the core, e.g. by means of moving a pedal. The other person has to execute the respective rotation for a longitudinal adjustment of the sheath. This procedure results in considerable expenses.

SUMMARY OF THE INVENTION

Therefore the invention provides a Bowden pull wire construction arrangement with which an adjustment of the active sheath length can be executed by one person.

According to the invention the support sleeve is arranged rotationally rigid, but is longitudinally movable on a sheath end piece A least one catch is rotatable in the circumferential direction with regard to the support sleeve and, in the rotated position, is axially engaged with at least one limit stop provided at the sheath end piece. In particular, the invention ensures that the catch is torsionally braced relative to the support sleeve and therefore a force acts automatically upon the catch in a circumferential direction and adjust it rotationally if an axial fixation of the support sleeve with regard to the sheath end piece is desired.

Such a fundamental arrangement makes it possible to adjust a bowden pull wire relative to the active sheath length by one person alone. This can be explained easily by means of the example of the throttle pedal of a motor vehicle. The core of the bowden pull wire is connected to the gas pedal on on side and to the carburetor lever on the other side. The sheath of the bowden wire is propped between fixedly mounted supports, one being on either side of the separation wall between the passenger room and the motor room. According to the invention, one operator merely has to push the gas pedal down briskly to the end position, wherein the sheath end piece on the carburetor side moves through the bore of the support and the support sleeve until the required curve of the sheath, relative to the end position of the gas pedal, has been achieved In this end position the support sleeve is fixed axially with regard to the sheath end piece According to the prior art, two persons are required for the execution of this fixing.

According to the invention, however, a relaxation of the bowden wire core achieved by pushing the gas pedal into its end position is sufficient, as now the supporting force of the support sleeve at the support declines and the catch can rotate in the circumferential direction into the arrested position.

In this context it has to be pointed out, however, that the invention does not exclude two-person service as the rotation of the catch is not necessarily automatic. i.e. effected by torsional bracing, it can also be executed by a second person. Therefore, the invention is not limited to an arrangement in which the support sleeve and the catch are torsionally braced relative to one another.

A simple embodiment of a support sleeve can be moved lengthwise on the end piece while preventing its rotation.

A preferred embodiment allows axial arrest of the support sleeve at any desired position along the sheath end piece by engaging the catch in the respective opening of a toothed-rod type profile of the sheath end piece.

A nut and the toothed-rod type profile is advantageous so that the catch is longitudinally movable and rotationally adjustable and axially fixable.

Various options of torsional bracing are preferred between the catch and the support sleeve, thus also giving the incentive to executed the torsional bracing by other means.

In an embodiment of the invention releasing of the axial fixation of the support sleeve is effected to allow for a readjustment of the bowden pull wire. Since, in practice, it is important to dimension the support sleeve and the locking sleeve as small as possible, provisions have to be made to rotate the locking sleeve from the arrested position into the axial rotation position.

If the support sleeve or the locking sleeve lies close to a friction layer of the support, the rotation of the catch is inhibited. In this case the torsional force of the chosen tensioning element is smaller than the frictional force of the friction layer. Therefore, the pedal or a comparable activation element can be moved briskly to its end position without the catch rotating as the friction layer prevents any rotation. If, however, the actuation element, such as a pedal, is allowed to return to its original position, the frictional force decreases, and as a result the torsional brace rotates the catch into the arrested position.

The axial rotation of the support sleeve on the sheath end piece may be made more difficult, as it has been found that an easy running guiding of these parts results in an inexact lengthwise adjustment of the Bowden wire sheath.

Accordingly it is an object of the invention to provide an adjustment construction for mounting in an opening of a support wall for the sheath of a Bowden wire in which the wire is movable and which includes a sheath end piece which has an end with a widened bore into which the sheath is engageable and which partly extends through a socket which is mounted in the opening of the support wall and in which the socket includes an opening through which a part of the end piece extends and which further includes a support sleeve mounted over the sheath end piece which includes a catch which is movable in a groove of a sheath end piece up to stop limits defined by the groove and which further includes a locking sleeve positioned on the sheath end piece which is rotated between the support sleeve and the socket.

A further object of the invention is to provide an adjustment construction for a Bowden wire which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the Drawings:

FIG. 1 is a longitudinal sectional view through one end of a supported Bowden pull wire with an arrangement for the adjustment of the active length of the sheath, conducted in accordance with the invention;

FIG. 2 is a top view of the arrangement according to FIG. 1 with the adjusted sheath length;

DESCRIPTION OF THE PREFERRED EMBODIMENT

Figure 6:
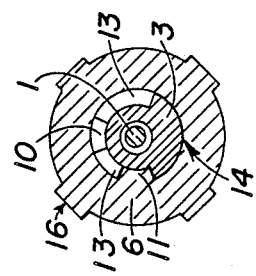
Figure 5:
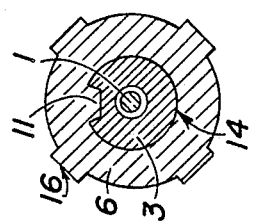
FIG. 5 is a cross sectional view taken along line V—V of FIG. 1.
Figure 4:
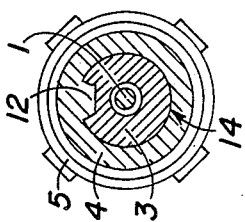
FIG. 4 is a cross sectional view taken along the line IV—IV of FIG. 1.
Figure 3:
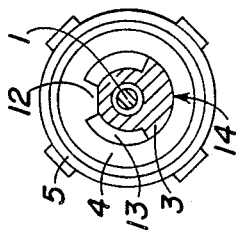
FIG. 3 is a cross section view taken along the line III—III of FIG. 1.

The Bowden pull wire assembly comprises a core 1 and a sheath 2 enveloping it slidable. One end of the sheath 1 is fixedly connected to a sheath end piece 3, which has to be propped against a support. The other end of the sheath 2 (not shown) is propped against the respective support 8 in a conventional manner. In this example it is assumed that the element actuating the core 1, e.g. a gas pedal, is connected to the left end of the core 1. If this element is actuated, a pulling force in the direction of the arrow 50 is exerted on the core 1.

The adjustment of the sheath end piece 3 relative to the support 8 and its consequent fixing results in the influencing of the core 1 and the distance between the ends of this core 1. This adjustment of the sheath end piece 3 with regard to the support 8 is necessary for the first adjustment of the Bowden pull wire as well as for later readjustments. The invention shows that the sheath end piece 3 is propped against the support 8 by means of a support sleeve 4 and a locking sleeve 6.

In the embodiment shown, a support sleeve 4 is mounted axially movable, but arrested against rotation on the sheath end piece 3. In the embodiment the rotational arrest is achieved because the sheath end piece 3 has a longitudinal groove 10 into which the support sleeve 4 engages with a feather key or feather key means 12.

The lengthwise mobility of the support sleeve 4 on the sheath end piece 3 should be tight, however. For this purpose the embodiment shows the arrangement of displacement ribs 14 defining a friction-increasing means on the circumference of the sheath end piece 3 which makes any sliding of the support sleeve 4 more difficult.

In addition, the locking sleeve 6 having a catch 11 is mounted slidable on the sheath end piece 3. This catch 11 engages with the groove 10 of the sheath end piece 3 and therefore allows the lengthwise movement of the locking sleeve 6 relative to the sheath end piece 3. If, however, the locking sleeve 6 with its catch 11 is rotated relative to the sheath end piece 3 and the support sleeve 4, the catch 11 engages with the limit stops 13, which extend on one, or on both sides, of the groove 10 and transversely with regard to it. Due to this rotation of the catch 11 a lengthwise movement of the locking sleeve 6 and therefore of the support sleeve 4 is avoided. Thus, the sheath 2 is supported in the axial direction with regard to the support 8.

The embodiment of FIGS. 1 and 2 shows a torsional bracing between the support sleeve 4 and the locking sleeve 6 by a spring means such as means a torsion spring 5, whose ends engage with the respective bores of these two sleeves 4 and 6 in the radial direction. An alignment of the catch 11 with the feather key 12.

The lengthwise mobility of the support sleeve 4 on the sheath end piece 3 should be tight however. For this purpose the embodiment shows the arrangement of displacement ribs 14 on the circumference of the sheath end piece 3 which makes any sliding of the support sleeve 4 more difficult.

In addition, the locking sleeve 6 having a catch 11 is mounted slidably on the sheath end piece 3. This catch 11 engages with the groove 10 of the sheath end piece 3 and therefore allows the lengthwise movement of the locking sleeve 6 relative to the sheath end piece 3. If, however, the locking sleeve 6 with its catch 11 is rotated relative to the sheath end piece 3 and the support sleeve 4, the catch 11 engages with the limit stops 13, which extend on one, or on both sides, of the groove 10 and transversely with regard to it. Due to this rotation of the catch a lengthwise movement of the locking sleeve 6 and therefore of the support sleeve 4 is avoided. Thus, the sheath 2 is supported in the axial direction with regard to the support 8.

The embodiment of FIG. 1 and 2 shows a torsional bracing between the support sleeve 4 and the locking sleeve 6 by means of a torsion spring 5, whose ends engage with the respective bores of these two sleeves 4 and 6 in the radial direction. An alignment of the catch 11 with the feather key 12 is achieved by rotating the locking sleeve 6 with regard to the support sleeve 4. Thus, it is possible to slide both sleeves 4 and 6 onto the sheath end piece 3. If no force or merely a minor axial force works on the locking sleeve 6, the torsional tension of the torsion spring 5 results in the rotation of the locking sleeve 6 with regard to the support sleeve 4 and therefore leads to the axial engagement of the catch 11 with the limit stops 13.

For an automatic one-person adjustment, the invention provides the propping of the locking sleeve 6 against a frictionally engageable end face held by the support 8. The frictionally engageable end face 7a is formed by a socket 7 which goes through the wall bore of the support 8 and is made from a material providing the required frictional force, e.g. elastomer. The locking sleeve 6 is propped on this socket 7. The frictional force between frictionally engageable end face 7a and the locking sleeve 6 prevents the locking sleeve 6 from rotating as long as the sheath 2 of the bowden pull wire executes an axial force on the locking sleeve 6 by means of the sheath end piece 3. This is the case in the adjustment of the active length of the sheath when the pedal is pushed into its end position. If the pedal returns into its original position, the propping force of the sheath 2, 3 is reduced, with the result that the torsional force of the torsion spring 5 is larger than the frictional force of the locking sleeve 6 at the socket 7. Now the catch 11 of locking sleeve 6 can be rotated with regard to the support sleeve 4, leading to an axial arresting of the support sleeve 4 with regard to the sheath end piece 3.

If the locking sleeve 6 is provided with dish-shaped surfaces 16 radial bores, circumferential ribs or such like, the locking sleeve 6 can be rotated easily with regard to the support sleeve 4 in order to allow for a readjustment of the bowden pull wire by means of a relative longitudinal adjustment of the support sleeve 4 and the sheath end piece 3.

Reference no. 15 in FIG. 2 shows the adjustment path which the sheath end piece 3 covers relative to FIG. 1 during the adjustment of the active sheath length according to the invention. FIG. 2 also shows that the groove 10 extends to the face end of the sheath end piece 3, but that the limit stops 13 of the toothed-rod type profile 9 begin only at a distance from the face end of the sheath end piece 3.

The adjustment of the bowden pull wire by one person is executed as follows: On the left side the core 1 of the bowden pull wire led through the support 8 is connected with the gas pedal (not shown) (e.g. with the gas pedal of motor vehicle) and on the right side it is connected to the carburetor lever. The sheath 2 between the two supports is curved arbitrarily at first. The support sleeve 4 and the locking sleeve 6 lie close to the socket 7 under axial tension. Their feather key 12 and catch 11 are guided in the groove 10. The sheath end piece 3 can be moved relative to the support sleeve 4 and the locking sleeve 6. The locking sleeve 6 cannot rotate as it is hindered by the friction between frictionally engageable end face 7a of of the socket 7 and the locking sleeve 6.

Now the gas pedal is moved briskly to its end position. The core 1 moves in the direction of the arrow 50 thus leading to the straightening of the sheath curve. Herein the end of the sheath end piece covers the distance 15. In this position represented in FIG. 2 the axial arresting of the support- and locking sleeve 4 and 6 relative to the sheath end piece 2 has to be executed. This is achieved automatically by moving the gas pedal back. The bowden wire sheath 2 wants to relax. Therefore the frictional force between the socket 7 and the locking sleeve 6 decreases. Now the torsional force of the torsion spring 5 goes into action by initiating a rotational adjustment of the locking sleeve 6 with regard to the support sleeve 4, resulting in the moving of the catch 11 into the opening between two limit stops 13 and therefore in an axial arresting.

What is claimed is:

1. An adjustment construction for adjusting the active sheath length of a Bowden pull wire for mounting in an opening of a support wall, comprising: a Bowden wire movable in the sheath; a sheath end piece having an end into which the sheath is engageable, said sheath end piece having a surface defining a plurality of stops, said stops being positioned providing gaps between adjacent stops, said sheath end piece having toothed rack-like profiling providing on an outer surface opposite said plurality of stops, said periphery of said sheath end piece defining a longitudinal groove extending through said stops and interrupting said stops; a socket for the support of the Bowden wire, said socket being mounted in the wall opening and having a passage therethrough for said sheath end piece and the wire and having an end engaged over said sheath end piece with a frictionally engageable end face; a support sleeve having an interior bore engageable around said sheath end piece, said support sleeve including a feather key means interconnecting said support sleeve with said sheath end piece and limiting relative rotation between said support sleeve and said sheath end piece but permitting relative axial movement therebetween; a locking sleeve positioned on said sheath end piece between said support sleeve and said socket, said locking sleeve including a catch element for allowing axially movement of said locking sleeve along said groove and for being positioned between said stops for preventing axial movement of said locking sleeve; and, torsion spring means connected to said support sleeve and connected to said locking sleeve biasing against rotational movement between said support sleeve and said locking sleeve.

2. An adjustment construction according to claim 1, wherein said locking sleeve includes a side facing said frictionally engageable end face, said side and said frictionally engageable end face being positioned for abutting engagement, said abutting engagement rotationally fixing said locking sleeve upon the application a sufficient force to prevent relative rotation.

3. An adjustment construction according to claim 1, wherein said locking sleeve is longitudinally slidable and rotatable on said sheath end piece including means torsionally bracing said support sleeve to said locking sleeve.

4. An adjustment construction according to claim 1, wherein said means torsionally bracing said support sleeve with said locking sleeve comprises a coil spring engageable over said locking sleeve and said support sleeve.

5. An adjustment construction according to claim 1, wherein said locking sleeve has a shape which allows for the use of tools for rotational adjustment by defining engagement elements.

6. An arrangement according to claim 1, wherein said socket comprises an elastic member having an exterior surface engaged in the opening of said wall, said frictionally engageable end face being provided on an end facing said locking sleeve which is engageable therewith.

7. An adjustment construction according to claim 1, wherein the exterior surface of said sheath end piece has a surface with friction increasing means for frictionally engaging said support sleeve.

* * * * *